Feb. 21, 1939.  A. AMES, JR  2,147,957
EYE TESTING INSTRUMENT
Filed Dec. 7, 1936  4 Sheets-Sheet 1
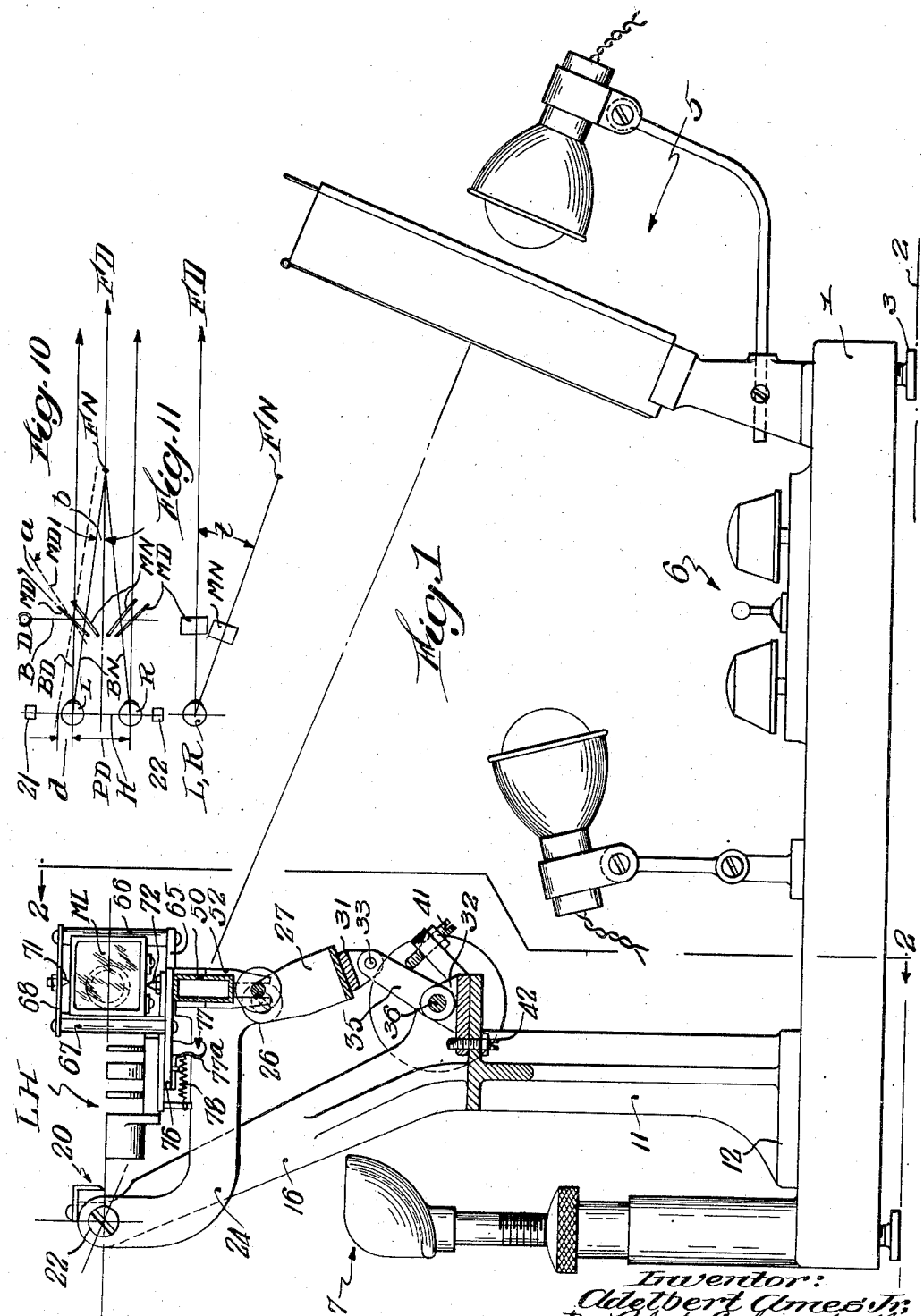

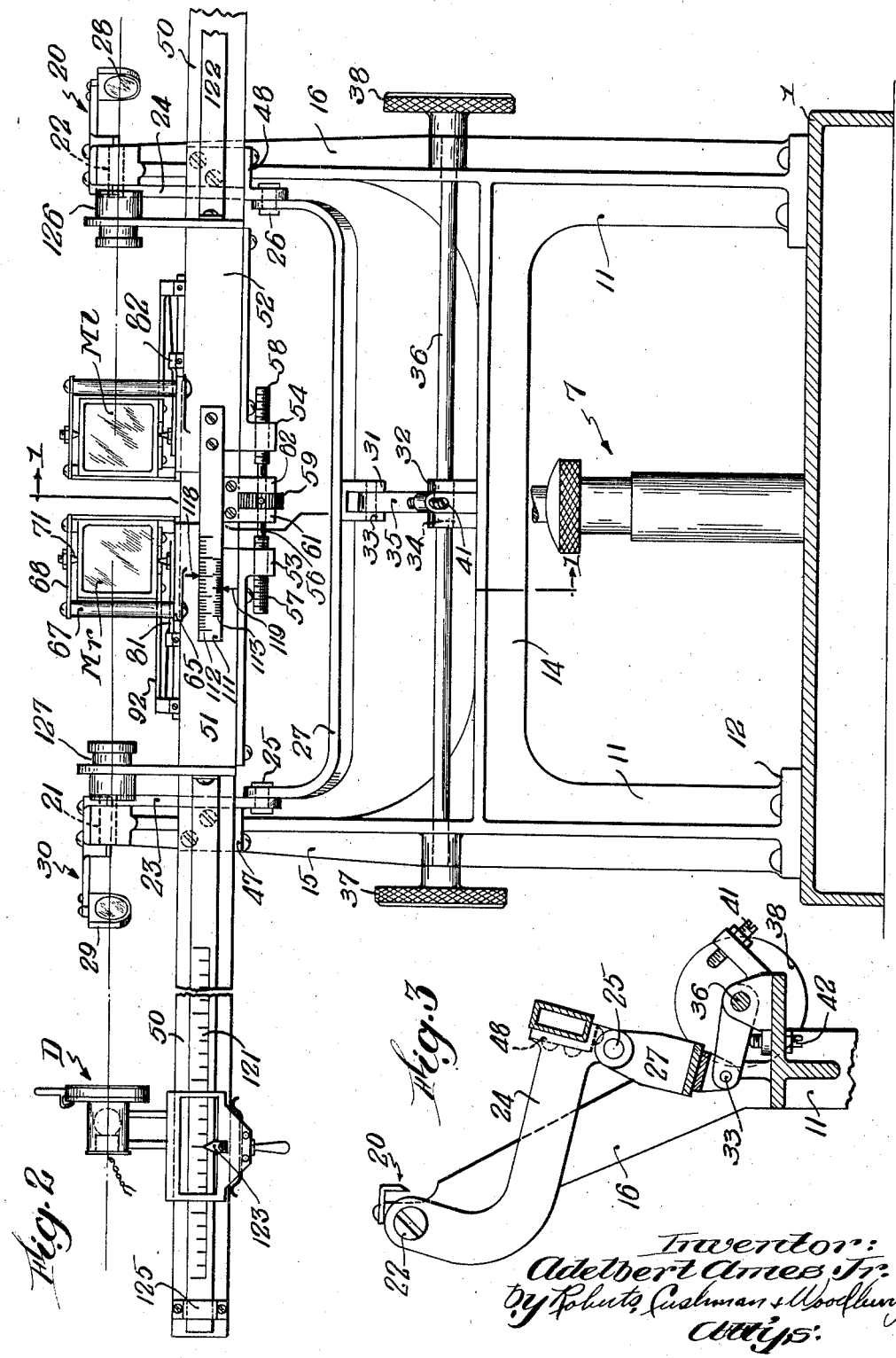

Feb. 21, 1939.　　　　A. AMES, JR　　　　2,147,957
EYE TESTING INSTRUMENT
Filed Dec. 7, 1936　　　4 Sheets-Sheet 3
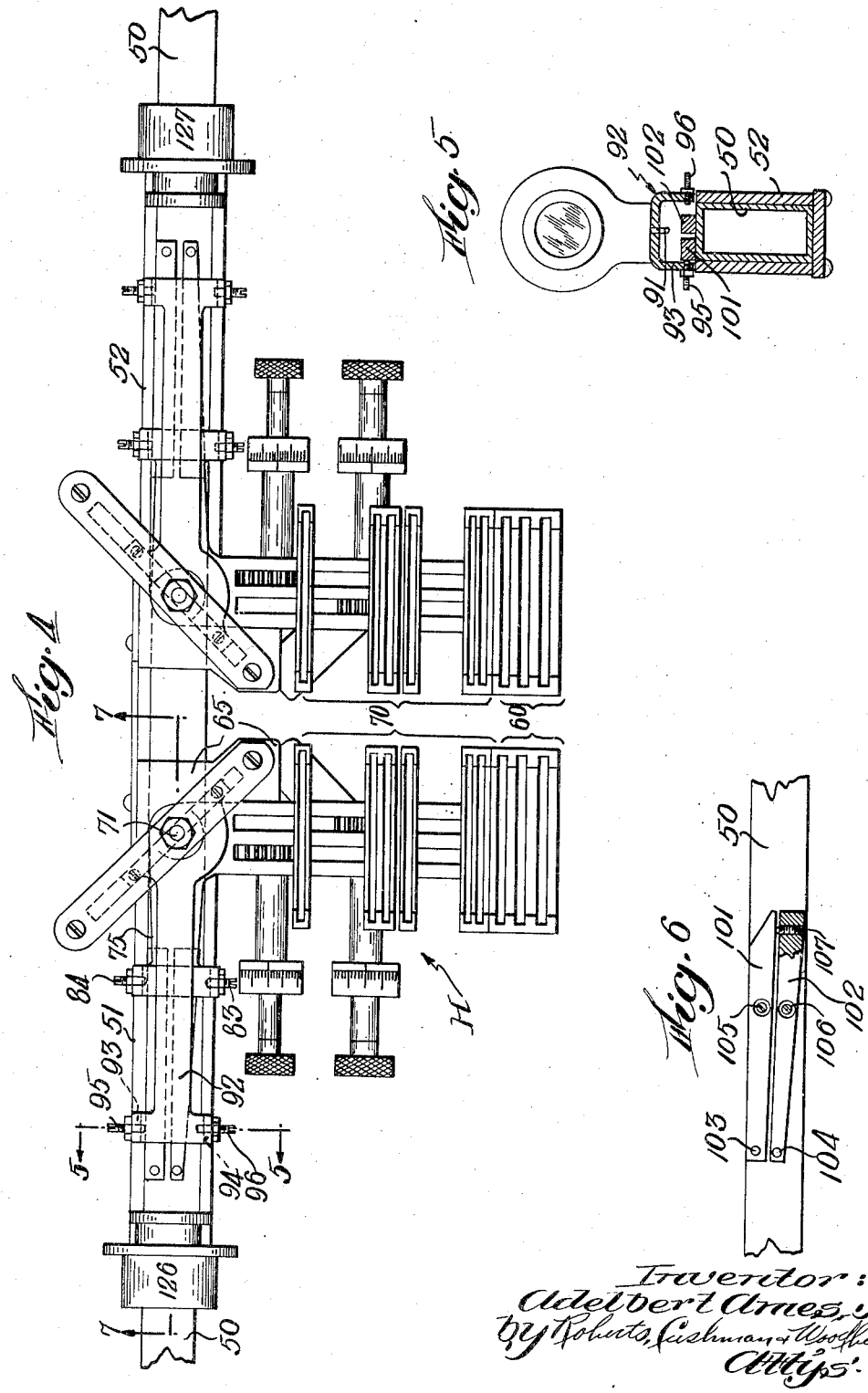

Feb. 21, 1939.  A. AMES, JR  2,147,957
EYE TESTING INSTRUMENT
Filed Dec. 7, 1936  4 Sheets-Sheet 4
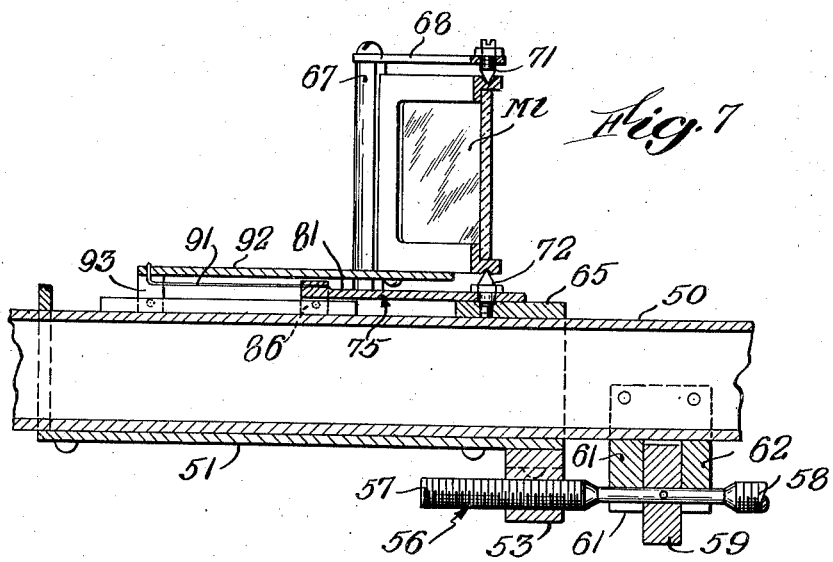
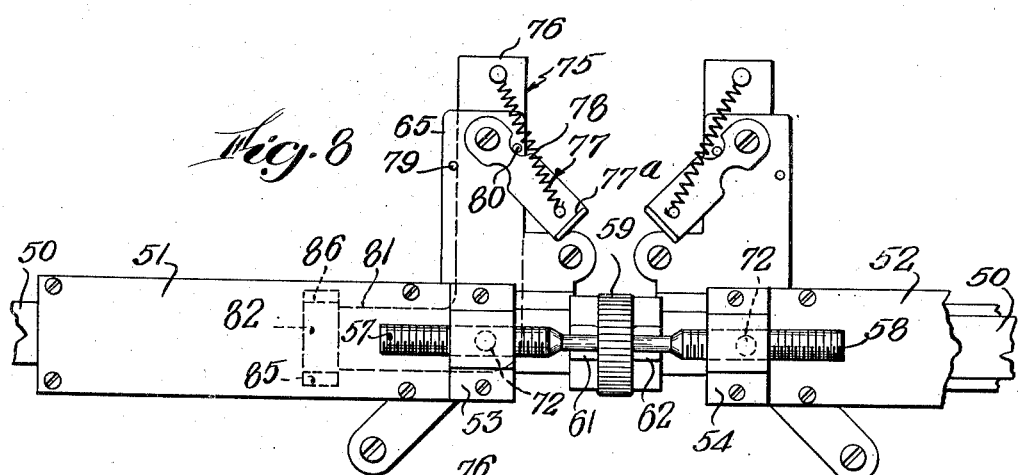
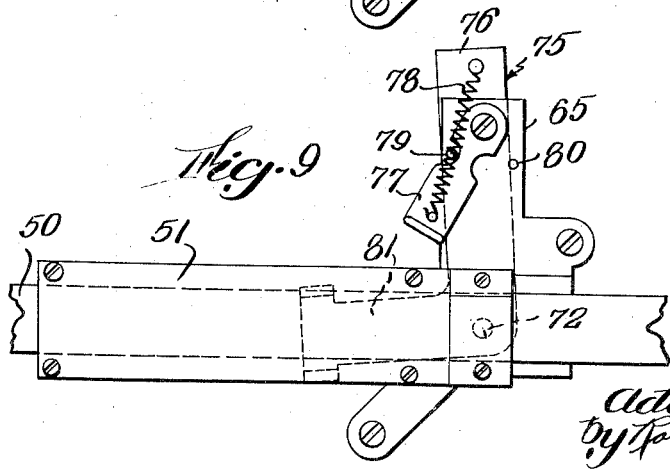
Inventor
Adelbert Ames Jr.
by Roberts, Cushman + Woodbury
Attys.

Patented Feb. 21, 1939

2,147,957

UNITED STATES PATENT OFFICE 2,147,957

EYE TESTING INSTRUMENT

Adelbert Ames, Jr., Hanover, N. H., assignor to trustees of Dartmouth College, Hanover, N. H., a corporation of New Hampshire Application December 7, 1936, Serial No. 114,608

11 Claims. (Cl. 88—20)

This invention relates to eye testing instruments, and more particularly to instruments for testing vision as affected by dioptric, muscular and eikonic defects. The device according to the invention is a development of the instruments described in Patents Nos. 2,063,015, dated December 8, 1936, and 2,095,235, dated October 12, 1937.

It is the main object of the present invention to provide a simple, rugged and comparatively inexpensive instrument which nevertheless permits the carrying out of all tests that can be performed with the above-mentioned previously described devices.

In one aspect, the invention provides for changes of vergence of the eyes not by actually rotating test objects, but by adjusting optical means which deviate towards the eye light rays coming from a test object. This principle renders the entire construction of the instrument very compact and simple and avoids expensive arrangements for rotatary adjustment about the centers of rotation of the eyes, as will appear from the following description.

Another feature of the invention is concerned with an arrangement for correlating the adjustments for pupilary distance and vergence of the eyes, the above-mentioned optical adjustment of test objects permitting an especially favorable solution of this problem.

Still another feature of the new instrument is a simplified arrangement for tilting test objects about a horizontal axis through the eyes of a patient, and this arrangement is also made possible by optically accomplishing the test object adjustment for changing vergence.

The new instrument also incorporates simple but efficient arrangements for setting and adjusting its construction elements.

These and other objects, aspects and features of the invention will be found in the following detailed description illustrating the genus of the invention with reference to a concrete embodiment thereof. The description refers to drawings in which:

Fig. 1 is a side elevation of the instrument, partly in section on line 1—1 of Fig. 2;

Fig. 2 is a section on line 2—2 of Fig. 1;

Fig. 3 is a section similar to Fig. 1, with mirrors, lens holders and frame omitted, and with the tilting device in lowered position;

Fig. 4 is a plan view of the instrument with the arms partly broken away and the supporting structure omitted;

Fig. 5 is a section on line 5—5 of Fig. 4;

Fig. 6 is the plan view of the cam structure shown partly in dotted lines in Fig. 4;

Fig. 7 is a section on line 7—7 of Fig. 4;

Fig. 8 is a partial bottom plan view of Fig. 4;

Fig. 9 is a plan view similar to Fig. 8, but with the lens carrier in different position; and Figs. 10 and 11 are diagrams illustrating the operation of the instrument.

Referring especially to Figs. 1, 2, and 3, the instrument is supported on a base plate 1 which may rest, for example, on a table 2, with leveling screws 3. Mounted on plate 1 is a target 5 for near vision tests, and electric control means 6 for the various light sources of the instrument. The target shown in Fig. 1 is similar to that described in the above-mentioned Patent No. 2,095,235, and its detail construction does not form a part of the present invention. For distant vision tests, the large screen described in that application could be used. However, it is understood that other types of targets for investigating dioptric, eikonic and muscular defects can be used with the present instrument, for example, screens disclosed in the above-mentioned Patent No. 2,063,015, or the testing device described in my copending application Serial No. 41,890, filed September 24, 1935, or indeed any device functioning in analogous manner.

The base plate 1 also supports a head fixating means which may consist of a simple chin rest, as shown at 7, or comprise more elaborate devices, as for example described in the above-mentioned applications.

Base plate 1 further supports a frame structure 11 on flanges 12, the frame having a cross bar 14 and two brackets 15 and 16. At the end of each bracket is a pivot support 21 and 22, respectively, and two swinging rods 23 and 24 are rotatably fastened with one of their respective ends to those pivot supports. As indicated in Fig. 10, these pivots are located in the horizontal axis of rotation H of the eyes as fixed by means of the head support. Eyes and instrument can be definitely correlated by moving the head with the adjustable head support until the corneas are in alignment with sights 20 and 30 having mirrors 28 and 29 permitting the operator to observe the sights and eyes from the front of the instrument.

Pivoted at 25 and 26 to the other ends of rods 23 and 24 is a fork 27 connecting in this manner the two rods. The fork 27 and the cross piece 14 of the frame have corresponding pivot pieces 31 and 32, respectively, in which are pivoted at 33 and 34, respectively, the two ends of a connecting link 35. Pivot 34 is formed by a shaft 36, fixed to link 35, extending through holes in brackets 15 and 16, and having knurled hand knobs 37 and 38 at its respective ends. Pivot piece 32 supports two adjustment screws 41 and 42, respectively, which limit the swinging movement of link 35 at either side.

It will be observed that fork 27 and link 35 constitute a toggle joint which can be moved by means of disks 37, 38 from one extreme position (as shown in Fig. 1) to another (as shown in Fig. 3), these two extreme positions being positively determined by screws 41 and 42, respectively.

Connecting rods 23 and 24 have flanges 47 and 48 to which is fastened a rod 50, for example of rectangular cross-section, and extending crosswise at both sides of the instrument. Slidingly supported upon rod 50 are two sleeves 51 and 52 whose top wall is partly cut away to expose rod 50, as shown in Fig. 7. Each sleeve has fixed thereto a threaded boss 53 and 54, respectively, for a spindle 56 with right hand and left hand threads 57 and 58, respectively, and a knurled disk 59 rotating between two flanges 61 and 62 screwed to rod 50. It will be evident that rotation of disk 59 will move sleeves 51 and 52 to equal amounts away from, or nearer to, the center line of the instrument defined by flanges 61 and 62.

Referring also to Figs. 4 to 9, the devices mounted on sleeves 51 and 52 will now be explained. Since these devices are symmetrically duplicated for the respective sides of the instrument, it is only necessary to describe one side or sleeve.

As shown in Figs. 1, 2, 8, and 9, a support plate 65 is fixed to sleeve 51. Posts 66 and 67 (Figs. 1 and 7) are screwed to plate 65 and connected with a top rail 68. A mirror Mr, mounted in a suitable frame is pivoted between two pointed support pins, pivot 71 being fastened to top piece 68 and pivot 72 to plate 65. Pin 72 also serves as pivot for an angular lens carrier 75 having a hole surrounding pin 72. One arm 76 of carrier 75 holds a trial lens holder LH which, for example, may comprise supports 69 for three dioptric trial lenses and adjustable supports 70 for eikonic test lenses of the type described in copending application Serial No. 67,665, of Kenneth N. Ogle, filed March 7, 1936.

A toggle lever 77 having a handle 77ᵃ is pivoted upon plate 65, connected to arm 76 with a spring 78, and limited in its swinging movement by stop pins 79 and 80 (Figs. 8 and 9).

The other arm 81 of carrier 75 has at its end a follower piece 82 of inverted U-shape, with two adjustment screws 83 and 84 in the downwardly extending arms 85 and 86 of piece 82 (Figs. 4, 7, and 8). Arm 81 is connected by means of a yielding member, for example a piano wire spring 91, to a mirror control lever 92 (Figs. 5 and 7) fixed to the frame of mirror Mr or Mt, respectively. Similar to arm 81, mirror control lever 92 has a U-shaped end with two downwardly extending arms 93 and 94 and two adjustment screws 95 and 96 (Figs. 5 and 7) constituting followers.

Within the followers of arms 81 and 92, two cam rails 101 and 102 (Figs. 5 and 6) are secured to arm 50 by means of pivot pins 103 and 104 and screws 105 and 106 engaging two holes of rails 101 and 102, respectively, the diameter of the holes being somewhat larger than that of the screws. A screw 107 arranged horizontally through one of the rails rests against the other rail. It will be evident that by loosening one of screws 105 and 106, the relative positions of rails 101 and 102 can be adjusted.

As shown in Fig. 2, dioptric test targets D are slidably fastened to both arms of rod 50. These targets may be of the type explained in the above-mentioned Patents Nos. 2,063,015 and 2,095,235, and, since their detail structure is not of the essence of the present invention, they are not described in detail herein.

Fig. 2 shows further a slide 111 fastened to sleeve 52 and therefore movable relatively to sleeve 51. Slide 111 has two scales 112 and 113 which have graduations and positions differing to amounts, and for purposes which will be explained hereinafter. Indices 118 and 119 on sleeve 51 correspond to scales 112 and 113.

For measuring the distances of the dioptric test targets from the eyes, scales 121 and 122 are provided, these scales being fastened to sleeves 51 and 52, as shown in Fig. 2.

Indices 123 on the test targets permit convenient reading of these distances. Guides 125, fastened to rod 50, slidably support the outer ends of scale strips 121, 122.

Auxiliary lenses 126 and 127, preferably having powers of +0.5D, may be fastened to sleeves 51 and 52, these lenses being described in detail in the above-mentioned Patent No. 2,095,235.

Referring now especially to Figs. 10 and 11, a light ray coming from test target D will be deviated by the mirrors in position MD into the eyes L or R in direction BD, causing object D to appear at infinite distance, as indicated at FD. The optical axes of the trial lens sets will have to be located in BD. In order to change the apparent location of D from FD to a point FN, corresponding for example to reading distance, it is necessary to bring the mirrors into position MN and the optical axes of the trial lens sets into position BN. This adjustment necessitates rotation of the mirrors through an angle $a$, and shifting thereof a distance $d$ in the direction of undeviated light rays B, in order to preserve the given pupilary distance PD. The optical axes of the trial lens set must be rotated an angle $b$ about the centers of rotation of the eyes. The values of $a$ and $d$ are, of course, dependent upon the location of the fixation points FD and FN, and the pupillary distance.

In the case of the embodiment herein described, the angular positions of mirrors and lens holders are determined by screws 83, 84, 95, 96 and the outer cam faces of rails 101 and 102. The straight line movement of the mirrors, and with it the preservation of the pupillary distance, are accomplished by means of threaded spindle 56 and knob 59.

The shape of the cam faces, and the corresponding positions of the contact points of the follower screws 83, 84, 95, 96 are determined in accordance with the desired convergence changes, by applying the elementary geometrical relations illustrated in Fig. 10. It will be obvious that the element which determines mirror and lens positions for distant vision (where the mirrors subtend angles of 45° with the visual axes and where the trial lens axes are parallel), does not have to effect adjustments dependent upon the pupillary distance. Hence, in the present embodiment, the controlling faces of rails 101 are parallel to ray B. On the other hand, the trial lens axes and the mirror inclinations for finite visual distances change with varying pupillary distance; hence, the controlling faces of rails 102 are inclined in order to provide the correct mirror and trial lens positions for each pupillary distance, as read on scales 112 and 113.

Fig. 11 illustrates the downward tilting movement of arm 50, for the purpose of duplicating the usual reading position where the eyes look downwardly at an object at near distance. From the foregoing it will be obvious that the tilting angle $t$ can be set and adjusted by means of stop screws 41 and 42, or similar arrangements.

When examining a patient with the aid of an instrument of this type, the head is positioned relatively to axis of rotation H defined by pivots 21 and 22, by means of sights 20 and 30, so that the centers of rotation of the eyes are located in that axis. The test lenses are then aligned with the pupils by means of knob 59. Assuming that tests for distant vision are made first, arm 50 will be raised into the position shown in Fig. 1, and followers 84, 95 contact cam rail 101 (Fig. 8).

When changing to near vision tests, the mirrors and lens holders are rotated with the aid of handles 77a, spring 78 moving trial lens carriers 75 into their new positions with followers 83 contacting the cam face of rail 102 (Fig. 9). Spring 91 moves mirror arm 92 until follower 96 likewise contacts rail 102. It will be noted that spring 91 permits the necessary relative movement between arms 81 and 92. Sleeves 51 and 52 are then moved with screw 59, until the pupillary distance previously read on upper scale 112 is again set on lower scale 113 corresponding to the reduced distance between the lens holder pivot points for near vision.

Arm 50 is then lowered until it rests on stop 42 (Fig. 3) and the near vision test can proceed.

It will be understood that the above described embodiment does not exhaust the possibilities of controlling the various elements of the instrument in order to accomplish the main object of the present invention, namely the adjustment of test objects for different convergence conditions without actually rotating these objects about the centers of rotation of the eye, and that mirror inclination, lens carrier inclination and pupillary distance adjustment can be correlated by means of mechanically more or less different instrumentalities accomplishing the functions explained with reference to the present embodiment.

It should be understood that the present disclosure is for the purpose of illustration only and that this invention includes all modifications and equivalents which fall within the scope of the appended claims.

I claim:

1. An instrument of the type described comprising a supporting frame, means for locating the eyes of a patient relatively to said frame, a test object supported on said frame for adjustment along a line intersecting the patient's median plane, light deviating means movably mounted on said frame for deviating rays coming from said test object into an eye, means for adjusting said deviating means along said line, and scale means fastened to said deviating means and movable in the direction of said line for measuring the distance of said object from said deviating means.

2. An instrument of the type described comprising a supporting frame, means for locating the eyes of a patient relatively to said frame, a test object supported on said frame for adjustment along a line intersecting the patient's median plane, light deviating means mounted on said frame for deviating rays coming from said test objects into an eye, lens supports mounted on said frame for holding test lenses between the eye and said deviating means, means for individually rotating said deviating means and said lens supports relatively to said frame for changing the vergence of eyes looking at said test object and for aligning said lens supporting means with said deviated rays and means for individually limiting the rotations of said rotating means relatively to said line.

3. An instrument of the type described comprising a supporting frame, means for locating the eyes of a patient relatively to said frame, a test object support mounted on said frame for pivotal adjustment about a horizontal axis substantially through the centers of rotation of both eyes, a test object adjustable on said support, means mounted on said support for holding lens elements between an eye and the test object, a toggle joint for tilting said support about said axis, and two stops on said frame limiting the movement of said toggle joint between two main positions defined by said stops.

4. An instrument of the type described comprising a supporting frame, means for locating the eyes of a patient relatively to said frame, a test object support mounted on said frame and having a track defining a horizontal line substantially parallel to the horizontal axis through the centers of rotation of the eyes and secured against angular deviations from said line, a test object adjustable on said support along said line, means mounted on said support for deviating light rays coming from said test object into an eye, means rotatably mounted on said support for holding lens elements between the eye and said deviating means, means for independently rotating said deviating means relatively to said line for changing the vergence of an eye looking at said test object, means for aligning said lens holding means with said deviated rays as determined by the position of said deviating means, means for tilting said support about said axis between two main positions corresponding to test directions of the line of vision of the eye, and in at least one of said directions an eikonic test target for comparing the ocular images of the respective eyes.

5. An instrument of the type described comprising a supporting frame, means for locating the eyes of a patient relatively to said frame, a test object support mounted on said frame and having a track defining a horizontal line substantially parallel to the horizontal axis through the centers of rotation of the eyes and secured against angular deviations from said line, a test object adjustable on said support along said line, means mounted on said support for deviating light rays coming from said test object into an eye, means rotatably mounted on said support for holding lens elements between the eye and said deviating means, means for independently rotating said deviating means relatively to said line for changing the vergence of an eye looking at said test object, and means for aligning said lens holding means with said deviated rays as determined by the position of said deviating means.

6. An instrument of the type described comprising a supporting frame, means for locating the eyes of a patient relatively to said frame, a test object support mounted on said frame, a test object mounted on said support for adjustment along a line intersecting the patient's median plane, means movably mounted on said support for deviating a ray coming from said test object into a point of reference within an eye thereby determining a given vergence of the eyes, means for rotating said deviating means relatively to said support to relocate said deviated ray and therefore to change said vergence, and means determining the center and angle of said rotation to pass said relocated ray through said point of reference.

7. An instrument of the type described comprising a supporting frame, means for locating the eyes of a patient relatively to said frame, a test object support mounted on said frame, test objects mounted on said support on respective sides of the patient's median plane for adjustment along a line intersecting said plane, two light deviating means movably mounted on said support for deviating rays coming from said test objects into points of reference within the respective eyes thereby determining a given vergence of the eyes, means for adjusting the distance of said light deviating means relatively to said support to change the distance of said points in conformity with a given pupillary distance, means for rotating said deviating means to relocate said deviated rays and therefore to change said vergence, and means determining the center and angle of said rotation to pass the relocated rays through said points of reference.

8. An instrument of the type described comprising a supporting frame, means for locating the eyes of a patient relatively to said frame, a test object support mounted on said frame, test objects mounted on said support on respective sides of the patient's median plane for adjustment along a line intersecting said plane, two light deviating means movably mounted on said frame for deviating rays coming from said test objects into points of reference within the respective eyes, means for rotating said deviating means relatively to said line to determine the vergence of the eyes looking at said test objects, means for adjusting the distance of said points for different pupillary distances, and means controlled by said distance adjusting means for determining the center and angle of said rotation to pass said deviated rays through said points at said vergence by compensating for the setting of said distance adjusting means.

9. An instrument of the type described comprising a supporting frame, means for locating the eyes of a patient relatively to said frame, a test object support mounted on said frame, test objects mounted on said support on respective sides of the patient's median plane for adjustment along a line intersecting said plane, two light deviating means movably mounted on said frame for deviating rays coming from said test objects into points of reference within the respective eyes, means on said support for movably holding lens elements between the eyes and said deviating means, means for adjusting said deviating means relatively to said line to determine a given vergence of eyes looking at said test objects, means for adjusting the position of said holding means to a given pupillary distance, and means fixing said adjustments of said deviating and said holding means for two different vergences to pass said deviated rays in alignment with said holding means through said points by maintaining said pupillary distance.

10. An instrument of the type described comprising a supporting frame, means for locating the eyes of a patient relatively to said frame, a test object support mounted on said frame, test objects mounted on said support on respective sides of the patient's median plane for adjustment along a line intersecting said plane, two light deviating means movably mounted on said frame for deviating rays coming from said test objects into points of reference within the respective eyes, thereby determining a given vergence of the eyes, means on said support for movably holding lens elements between the eyes and said deviating means, means for adjusting said deviating means relatively to said line to determine a given vergence of eyes looking at said test objects, means controlling the position of said holding means relatively to said line aligning them with said rays deviated to conform to said vergence, and means controlled by said adjusting means for changing the distance of said holding means for different pupillary distances by maintaining said vergence.

11. An instrument of the type described comprising a supporting frame, means for locating the eyes of a patient relatively to said frame, a test object support mounted on said frame, two test objects mounted on said support on respective sides of the patient's median plane for adjustment along a line intersecting said plane, means movably mounted on said support for deviating rays coming from said test objects into points of reference within the respective eyes thereby determining a given vergence of the eyes, means for rotating said deviating means relatively to said support to relocate said deviated rays and therefore to change said vergence, means determining the center and angle of said rotation to pass said relocated rays through said points of reference, and in the direction of said deviated rays an eikonic test target for comparing the ocular images of the respective eyes.

ADELBERT AMES, Jr.